A. BURLAT AND A. RENAUDIN.
MOTORCYCLE.
APPLICATION FILED FEB. 24, 1920.

1,394,516.

Patented Oct. 18, 1921.
4 SHEETS—SHEET 1.

Witnesses
Jean Germain
Guillaume Pioch

Inventors
Antoine Burlat
Alfred Renaudin

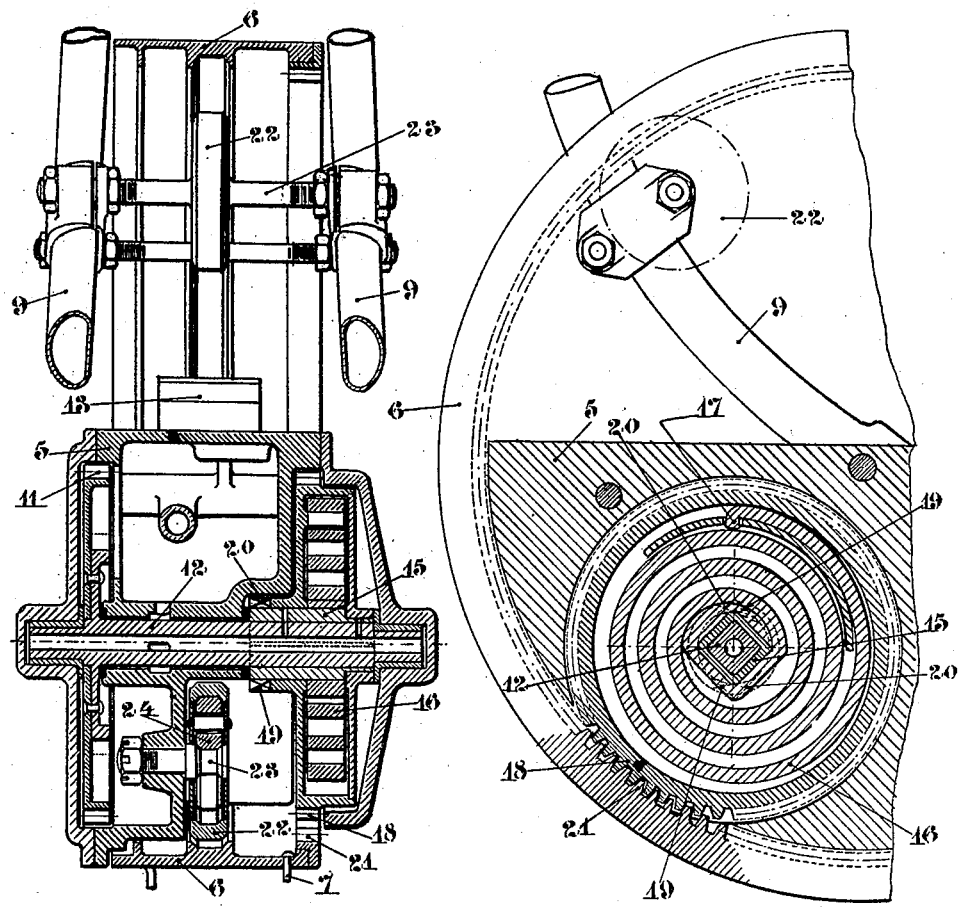

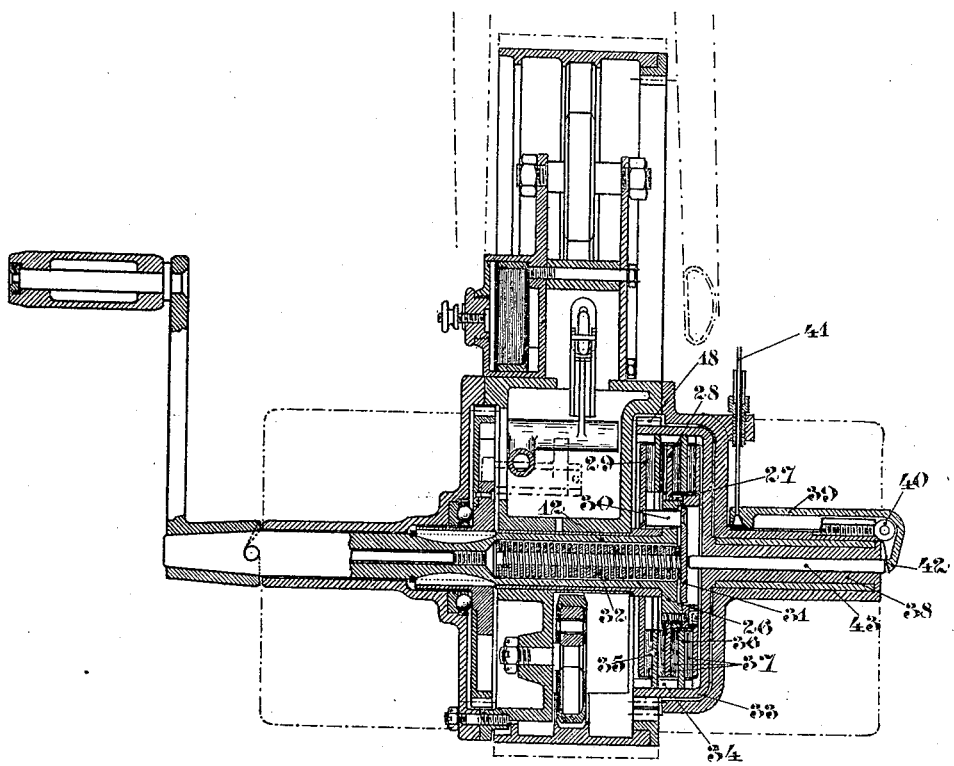

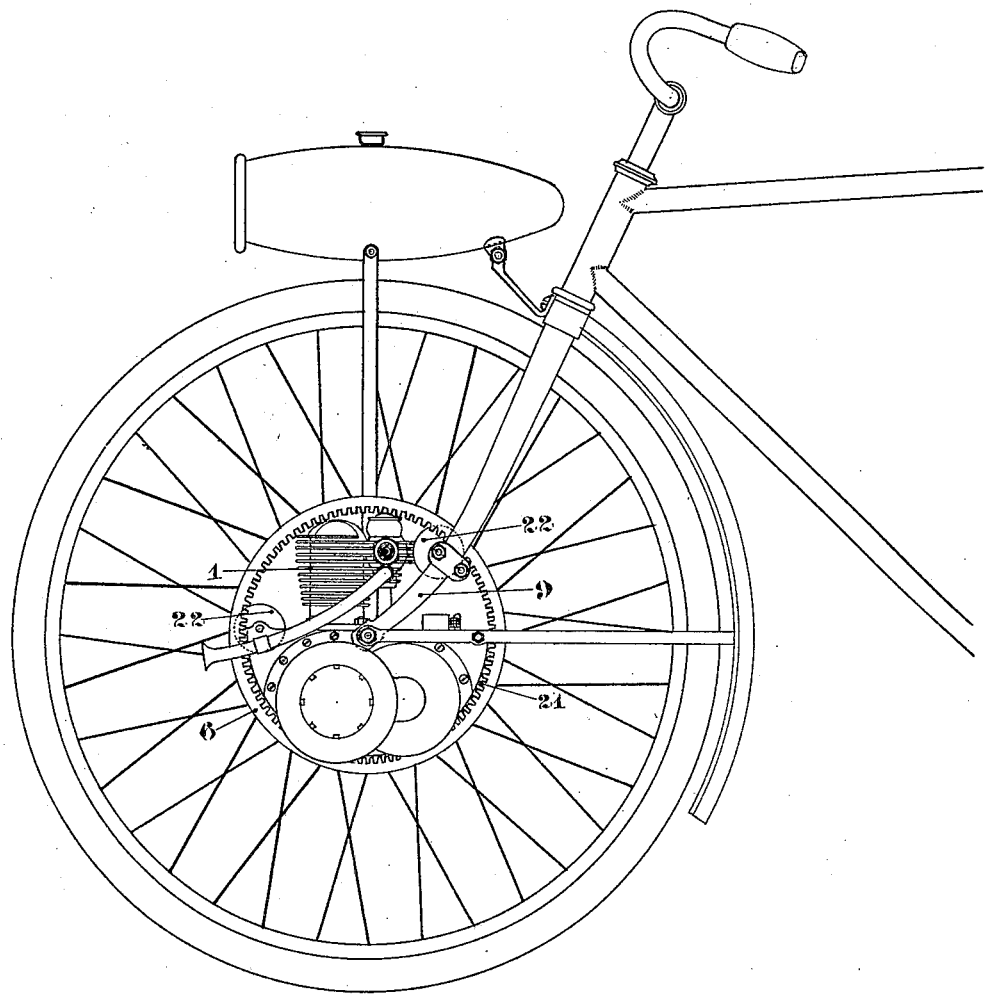

UNITED STATES PATENT OFFICE.

ANTOINE BURLAT AND ALFRED RENAUDIN, OF LYON, FRANCE.

MOTORCYCLE.

1,394,516.  Specification of Letters Patent.  Patented Oct. 18, 1921.

Application filed February 24, 1920. Serial No. 360,782.

*To all whom it may concern:*

Be it known that we, ANTOINE BURLAT and ALFRED RENAUDIN, citizens of the French Republic, of 8 bis Impasse St., Alban, Lyon, France, have invented certain new and useful improvements in Motorcycles, of which the following is a specification.

This invention relates to improvements in motor cycles.

According to this invention the motor is placed in the center of the front or back wheel of a bicycle or the like, and by suitable gearing directly drives the latter.

This arrangement, which allows the chain or belt transmitters hitherto employed to be omitted, is characterized by the following points:—

1. The motor replaces the axle of the wheel and is fixed in its place.

2. The centering and revolution of the wheel around the motor are effected on three rollers, the axles of which are secured to the fixed parts, motor, fork or frame. These rollers roll in a hub-groove, guiding the wheel laterally.

3. The motor transmits its movement by means of gearings to the hub of the wheel which is provided with an interiorly toothed crown, and in order that the driving may not be subject to the variations of the motor couple, transmisison gearing is provided driven by a spring, which stretches at the explosion and relaxes during the three other movements, thus producing a practically constant strain on the toothed crown.

The annexed drawings illustrate by way of example the arrangement of the motor in the hub of a front bicycle wheel.

Fig. 2 is a vertical section through the axle of the elastic gear which transmits the movement to the hub.

Fig. 3 is an elevation partly in section of the elastic driving gear and of the crown wheel secured to the hub.

Fig. 4 is a section of a modified form of gear between the driving shaft and the driven shaft.

Fig. 5 is an elevation of the front wheel of a bicycle provided with the motor.

Figure 1:
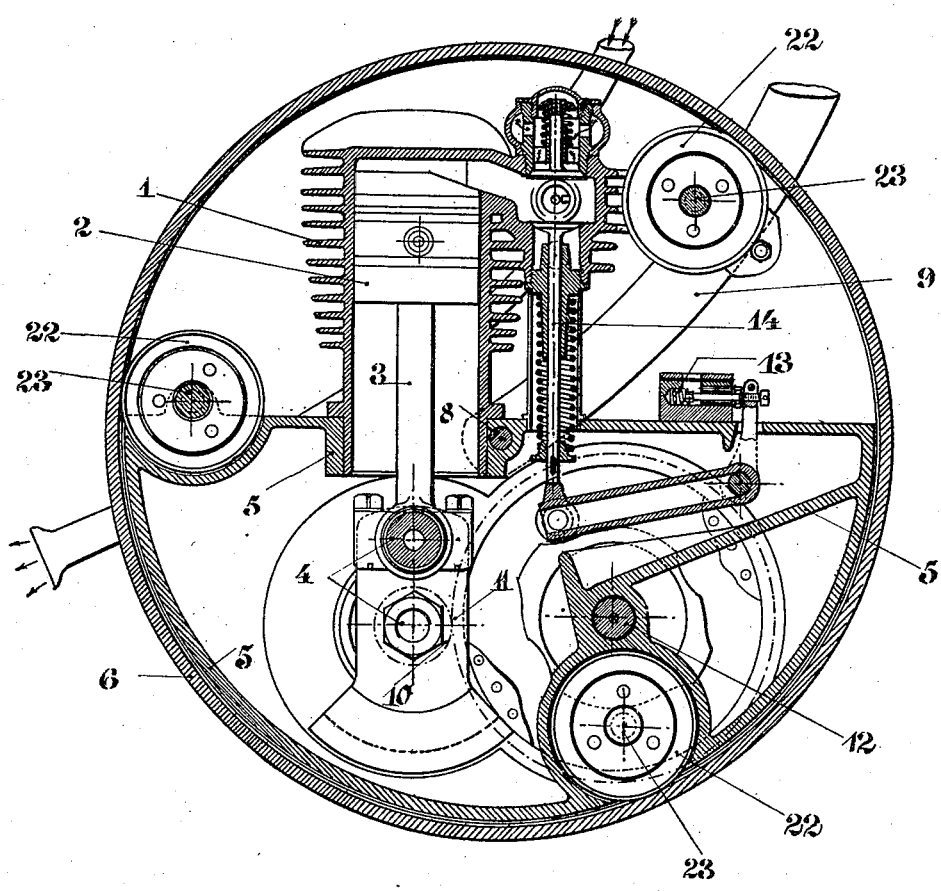
Figure 1 illustrates the motor in sectional elevation.

The motor comprises a cylinder 1 with piston 2, connecting rod 3 and crankshaft 4 (provided with a flywheel), the whole fitted into a casing 5 capable of being placed inside the large hub 6 carrying the spokes 7 which connect the felly of the wheel thereto.

The whole of the arrangement is held at the middle, by the axle 8, at the end of the fork 9 of the bicycle. To prevent the motor from rotating around the axle 8, the rigidity of the mud-guard and of the arm which attaches it to the axle 8 is made use of.

The crankshaft 4 is provided with a pinion 10 which gears with a toothed wheel 11 of a diameter four times as great and integral with the shaft 12 which is used for transmission and for control of the accessories of the contact-breaker 13 and the exhaust valve 14.

The shaft 12 drives a square nut 15 which controls the helical spring 16, of which the end 17 is engaged in a recess of the gear wheel 18, the rotatory movement of which is produced when the shaft 12 revolves.

The nut 15 has teeth 19 which engage between teeth 20 cut in the back of the hub of the gear wheel 18. The purpose of these teeth is to prevent the complete unwinding of the spring 16 and to allow a rotation of more than 90° between the shaft 12 and the gear wheel 18, so that, under the action of the explosion, the shaft 12 has an advance movement with respect to the driving gear 18 and thus causes the winding and tensioning of the spring 16. This gear wheel 18 drives the crown wheel 21 integral with the hub 6 and with the wheel. This arrangement provides an elastic connection between the motor and the wheel and obtains a practically constant driving strain on the teeth 21, thus avoiding abnormal wear and tear of the fork, the wheel and the whole bicycle at the moment of the explosions, and without loss of energy.

The hub 6 and the wheel which is integral therewith are kept centered around the motor by three rollers 22 which revolve around fixed axles 23 and roll on rollers 24. The latter rollers are engaged in a track, both on the axles and inside the rollers 22, the latter are well held, diametrically and laterally and further are engaged in a track provided in the hub 6 and secure the freedom of rotation of the wheel, as well as its lateral guiding.

The modification illustrated in Fig. 4 contains, in the place of gearing by a helical spring 16, a disk gearing allowing of starting by means of a crank and at the same time insuring a slip in order to prevent the injurious effects of the variations of the motor couple. This gearing comprises a driving shaft 12 connected to a plate 26 provided with channelings 27 allowing rotatory drive of a metal disk 28 while leaving this disk at liberty for a lateral displacement. The plate 26 also drives a third disk 29 connected by tie pieces 30 to a plate 31 on which is exerted the pressure of a spring 32. Around the whole of this is arranged the transmission gearing 18 cut out around the coupling-bell 33 which itself has channelings 34 which drive the disks 35 and 36. Between the various driving or driven disks are placed friction-disks 37 made of a product known in the trade by the name of "ferodo," which have no other purpose than that of securing a coefficient of friction as constant as possible and avoiding the wearing out of the metal disks.

The working of this clutch is as follows:—

The pressure of the spring 32 being exerted on all the disks, there ensues an equal speed of the driving shaft 12 and the driven shaft 38; but as the driven couple is function of the pressure of the spring and of the coefficient of friction, slip is produced when the driving couple becomes greater than the driven couple and thus the sudden shocks are avoided which might be produced if such an arrangement were not employed.

The uncoupling is produced by nullifying the pressure of the spring 32 by means of the lever 39 pivoted at 40 and actuated from a distance by means of a driving rod 31, the arm 42 of the said lever pushing a rod 43 which in its turn pushes back the plate 31.

What we claim as our invention and desire to secure by Letters Patent of the United States is:—

1. In a motor cycle a motor fixed centrally within a wheel of said cycle, a cylindrical casing surrounding said motor, a wheel hub surrounding said casing, gearing between said casing and hub, roller bearings between said wheel hub and said casing and elastic means whereby the power of the motor is transmitted to said wheel in a constant and even manner.

2. In a motor cycle and internal combustion motor fixed centrally within a wheel of said cycle a cylindrical casing surrounding said motor, a wheel hub surrounding said casing, an interiorly toothed crown within said hub, a pinion mounted on the motor shaft, a toothed wheel gearing therewith, a shaft on which said toothed wheel is fixed, a square nut on said shaft, a helical spring, the inner end of which is attached to said nut, a recessed gear wheel loosely mounted on said shaft, and housing said spring and to which the outer end of said spring is connected, and coacting teeth on said nut and the hub of said gear wheel.

3. In a motor cycle, an internal combustion engine fixed centrally within a wheel of said cycle, a cylindrical casing inclosing said motor, a wheel hub surrounding said casing, roller bearings between said wheel hub and said casing, a shaft, a crank connected thereto at one end thereof, a plate provided with channeling at the other end thereof, a driving disk rotated by said plate and capable of lateral displacement, a second driving disk rotated by said plate, a second plate connected to said second disk, a spring acting on said plate, friction disks between said driving disks, a coupling member having channels coöperating with said driving disks, gearing between said coupling member and said cylindrical casing and means for nullifying the pressure of said spring on said second plate.

In witness whereof we have signed this specification in the presence of two witnesses.

ANTOINE BURLAT.
ALFRED RENAUDIN.

Witnesses:
 JEAN GERMAIN,
 LOUIS ERCHER.